March 22, 1949. E. W. MURPHEY 2,465,112
COLLAPSIBLE WHEELBARROW
Filed March 16, 1948 2 Sheets—Sheet 1
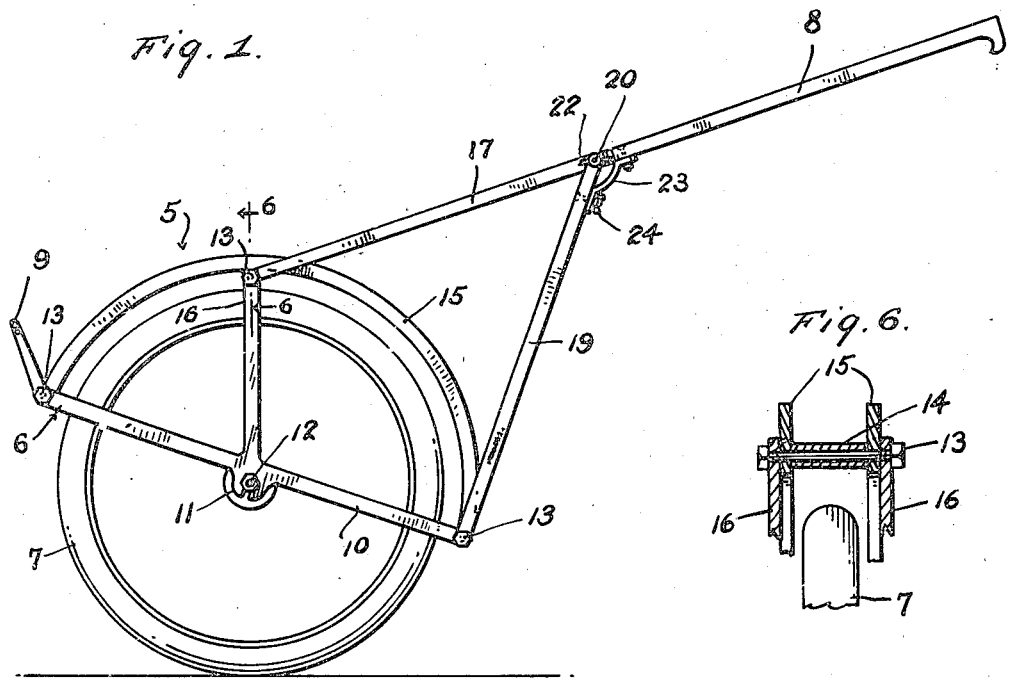
Fig. 1.
Fig. 6.
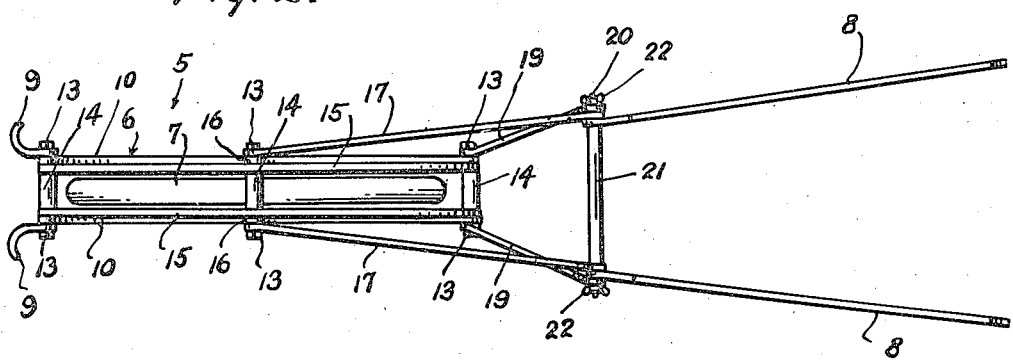
Fig. 2.
Fig. 7.
Inventor
Ernest W. Murphey
By L. B. James
Attorney

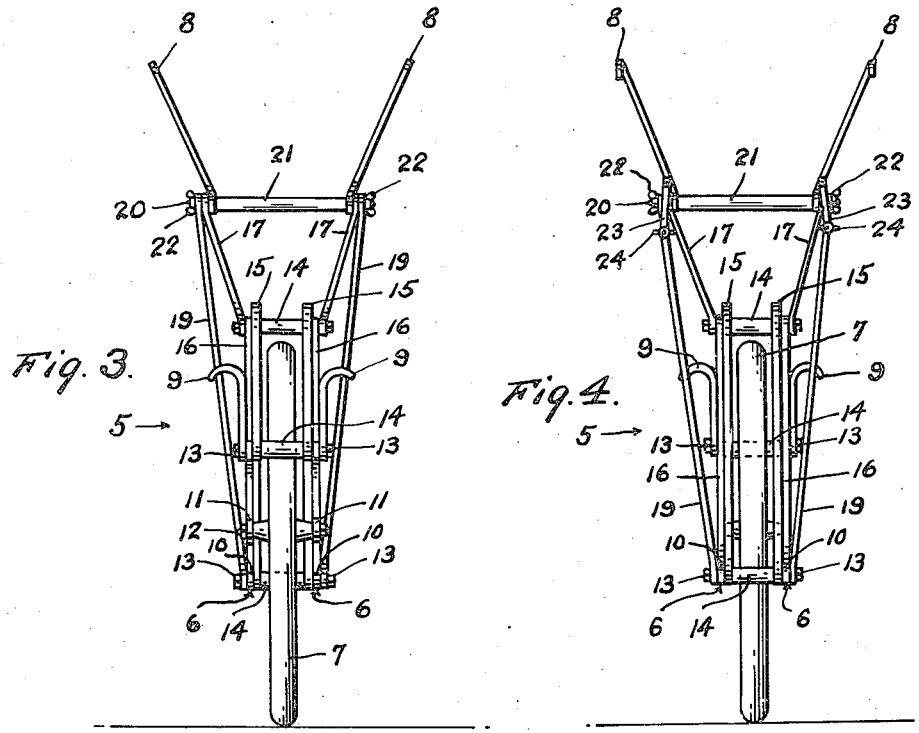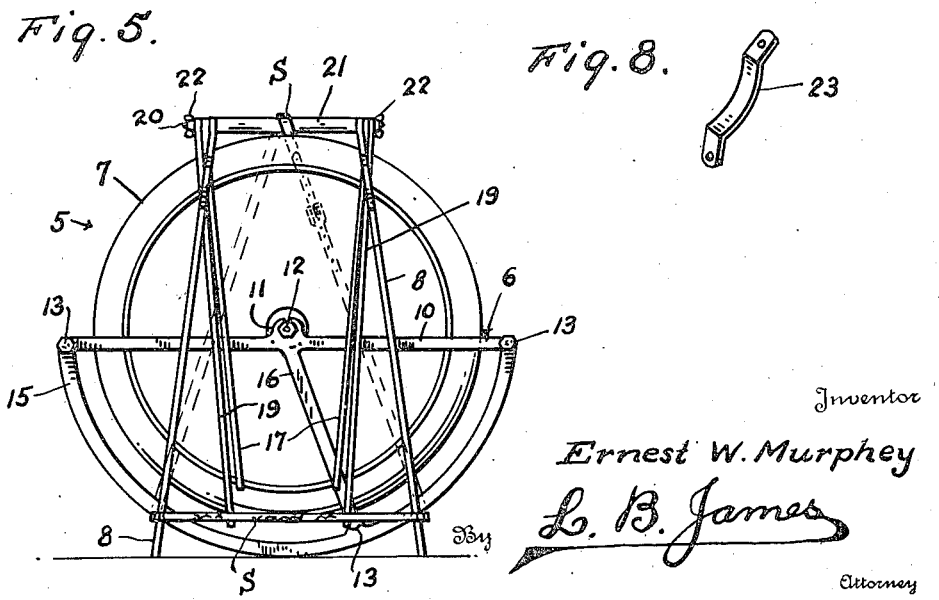

Patented Mar. 22, 1949

2,465,112

UNITED STATES PATENT OFFICE 2,465,112

COLLAPSIBLE WHEELBARROW

Ernest W. Murphey, Yreka, Calif.

Application March 16, 1948, Serial No. 15,080

1 Claim. (Cl. 280—36)

This invention relates to the official class of land vehicles and more particularly wheel barrows.

The primary object of this invention resides in the provision of a light collapsible wheel barrow adapted to convey deer and other large wild animals through the woods, over hills or from other places where they have been killed.

Another object of this invention resides in the provision of a wheel barrow of such light construction that it can be folded and carried by a hunter into the woods and quickly disposed in operative position for conveying deer and other large animals through the woods, over hills or from other places where they have been killed.

A further object of this invention resides in the provision of a collapsible wheel barrow of light construction adapted to be readily unfolded so it can be either loaded with heavy game or other articles and pushed by an individual.

A still further object of this invention resides in the particular construction of the skeleton frame of the wheel barrow.

With these and other objects in view, this invention resides in certain novel features of construction and arrangement of elements to be hereinafter more particularly set forth in the specification, illustrated in the accompanying drawings and pointed out in the appended claim and, although this disclosure depicts my present conception of the invention, the right is reserved to resort to such departures therefrom as come within the scope of the claim.

In the accompanying drawings forming a part of this application;

Fig. 1 is a side view of the wheel barrow in operative condition.

Fig. 2 is a plan view thereof.

Fig. 3 is a front view of the wheel barrow.

Fig. 4 is a rear view thereof.

Fig. 5 is a side view of the wheel barrow disposed in folded condition.

Fig. 6 is an enlarged sectional view taken approximately on line 6—6 of Fig. 1.

Fig. 7 is a perspective view of one of the adjustable bars.

Fig. 8 is a perspective view of one of the corner braces.

In the present illustration of this invention the numeral 5 designates, in general, a collapsible wheel barrow consisting of a skeleton frame 6 preferably mounted on a single bicycle wheel 7 and having handles 8 extending rearwardly therefrom and adjustable bars 9 at its front end to retain a deer's neck therebetween or hold bundles or other articles on the wheel barrow.

The frame 6 consists of laterally spaced sills 10 between which the bicycle wheel 7 is rotatably secured as by forks 11 formed on the sills so as to engage the axle 12 of the wheel.

Secured in lateral spaced relation to opposite ends of the sills 10, as by cap-screws 13 passing through their ends and spacing sleeves 14, are substantially semi-circular wheel guards 15. Said wheel guards are connected to the sills by braces 16 to prevent them from collapsing under weight of large game or articles disposed thereon.

Removably fastened between the wheel guards at the points of intersection thereof with the aforesaid braces 16 are rearwardly diverging triangular beams 17 having rearwardly extending handles 8 and downwardly extending braces 19 secured thereto by a bolt 20 passed through a sleeve 21 between the same and secured by a nut 22, thumb-screw or the like. Said braces 19 have their lower ends removably connected to the rear ends of the sills 10 by the rearmost cap-screws 13 or the like while the handles are removably connected to said braces 19 by corner braces 23 and wing-nuts 24 or the like. Said corner braces are adapted to be detached from the braces 19 so the handles may be swung on the bolt 20 to fold the same against the beams 17 and braces 19 subsequent to detaching them from the guards and sills.

With the wheel barrow set up for conveying a deer from the point where it is killed, the hunter lifts it on the guards and beams with its neck lodged between the adjustable bars 9 so it will not roll sidewise and off the same and, when used to convey bundles, packs and the like, they are loaded on the beams against the bars 9 and also in the space between the rear portions of the guards, beams and braces thereof.

When the wheel barrow is disposed in compact condition for transportation on the back of a hunter, the wheel with its guards and adjustable neck engaging bars are disconnected from the beams and braces thereof and, together with the handles, are folded and thereafter tightly fastened to the wheel and its guards by pack straps S which are disposed over the shoulders so the hunter can carry the same on his back in comfort.

With this invention fully described, it is manifest that a light and collapsible wheel barrow is provided for the purposes set forth and, through the particular assemblage of elements embodying its construction, it can be cheaply manufactured and sold at a reasonable price.

Having thus described my invention, what I claim and desire to protect by Letters Patent is:

A collapsible wheel barrow comprising, a wheel, substantially semi-circular guards disposed above the wheel on opposite sides thereof, sills connecting the lower ends of each guard, spacing sleeves between the ends of the guards and sills, forks on the sills secured to the axle of the wheel, braces connecting the sills to the guards, diverging beams having their front ends removably connected to the guards at the upper ends of the braces thereof, handles extending rearwardly from the beams, braces extending downwardly from the rear ends of the beams and inner ends of the handles with their lower ends bearing against the rear ends of the sills, a spacing sleeve disposed between the rearward ends of the beams and front ends of the handles, a bolt extending through the contacting ends of the beams, handles and braces thereof, a bolt extending through the rear ends of the guards, sills, sleeve therebetween and lower ends of the beam braces, adjustable bars disposed against the front ends of the sills, a bolt extending through the adjustable bars, front ends of the sills, guards and sleeve therebetween, corner braces secured to the handles with their free ends bearing against the braces of the beams, wing-nuts removably securing the corner braces to the beam braces, and cap-screws securing the front ends of the beams to the guards.

ERNEST W. MURPHEY.

No references cited.